(12) United States Patent
Enomoto et al.

(10) Patent No.: US 9,357,095 B2
(45) Date of Patent: May 31, 2016

(54) ILLUMINATION DEVICE AND IMAGE READING DEVICE USING SAID ILLUMINATION DEVICE

(71) Applicants: Shinnosuke Enomoto, Yamanashi (JP);
Seiji Nishizawa, Yamanashi (JP);
Masataka Hamada, Yamanashi (JP)

(72) Inventors: Shinnosuke Enomoto, Yamanashi (JP);
Seiji Nishizawa, Yamanashi (JP);
Masataka Hamada, Yamanashi (JP)

(73) Assignee: NISCA CORPORATION, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 14/438,509

(22) PCT Filed: Oct. 29, 2013

(86) PCT No.: PCT/JP2013/079320
§ 371 (c)(1),
(2) Date: Apr. 24, 2015

(87) PCT Pub. No.: WO2014/069485
PCT Pub. Date: May 8, 2014

(65) Prior Publication Data
US 2015/0288842 A1 Oct. 8, 2015

(30) Foreign Application Priority Data
Oct. 30, 2012 (JP) ................................. 2012-238526

(51) Int. Cl.
*H04N 1/04* (2006.01)
*H04N 1/028* (2006.01)
*H04N 1/00* (2006.01)

(52) U.S. Cl.
CPC ....... *H04N 1/02855* (2013.01); *H04N 1/00989* (2013.01); *H04N 1/02835* (2013.01); *H04N 1/02895* (2013.01)

(58) Field of Classification Search
CPC .......... H04N 1/02855; H04N 1/00989; H04N 1/02835; H04N 1/02895

USPC .......... 358/475, 484, 487, 509, 506; 399/220, 399/221; 250/227.11, 234–236; 355/67–71
See application file for complete search history.

(56) References Cited

U.S. PATENT DOCUMENTS 8,659,806 B2 *   2/2014   Kawano ............ H04N 1/00986
                                                358/471
8,853,942 B1 *  10/2014   Lewis, Jr. .................. F21V 7/04
                                                313/612

(Continued)

FOREIGN PATENT DOCUMENTS

JP    2010-087809 A    4/2010
WO   2012-105151 A1    8/2012

OTHER PUBLICATIONS

PCT, "International Search Report for International Application No. PCT/JP2013/079320".

*Primary Examiner* — Cheukfan Lee
(74) *Attorney, Agent, or Firm* — Manabu Kanesaka (57) ABSTRACT

Provided are: an illumination device having a configuration in which a temperature rise of a radiation member is suppressed in a limited volume to thereby maintain a temperature of an LED at a predetermined value or less and an image reading device provided with the illumination device. In order to release heat generated by the LED from a substrate on which the LED is mounted, a first heat radiation plate (43) and a second heat radiation plate (47) are provided on both sides of the LED-mounted substrate; the second heat radiation plate (47), the LED-mounted substrate, and the first heat radiation plate (43) are installed in this order on a second frame (40) that supports the LED-mounted substrate, first and second heat radiation plates (43) and (47); a fan is disposed on the first heat radiation plate (43) side; when viewing the second frame (40) in a direction perpendicular to a longitudinal direction thereof, a cross-sectional profile of the second heat radiation plate (47) has an area protruding with respect to a cross-sectional profile of the first heat radiation plate (43); and the configuration is such that wind from the fan is aggressively blown against the first and second heat radiation plates (43) and (47).

9 Claims, 7 Drawing Sheets

(56) References Cited

U.S. PATENT DOCUMENTS

| | | | | |
|---|---|---|---|---|
| 8,958,022 B2 * | 2/2015 | Youk | ............... | G02B 6/0083 349/161 |
| 9,151,465 B2 * | 10/2015 | Fujiuchi | ............... | F21S 4/008 |
| 2007/0285740 A1 * | 12/2007 | Onishi | ............... | H04N 1/02815 358/475 |
| 2010/0014315 A1 * | 1/2010 | Fujimoto | ............... | G02B 6/001 362/615 |
| 2012/0307322 A1 * | 12/2012 | Ozawa | ............... | G03G 15/0409 358/475 |
| 2013/0314756 A1 * | 11/2013 | Amemiya | ............... | F21V 13/04 358/497 |
| 2014/0071500 A1 * | 3/2014 | Kurotsu | ............... | H04N 1/00 358/474 |
| 2014/0111835 A1 * | 4/2014 | Ozawa | ............... | H04N 1/028 358/475 |
| 2014/0226191 A1 * | 8/2014 | Enomoto | ............... | H04N 1/00588 358/496 |
| 2014/0293368 A1 * | 10/2014 | Kurotsu | ............... | G02B 6/0096 358/474 |

* cited by examiner

ILLUMINATION DEVICE AND IMAGE READING DEVICE USING SAID ILLUMINATION DEVICE

RELATED APPLICATIONS

The present application is a National Phase of International Application No. PCT/JP2013/079320 filed Oct. 29, 2013, and claims priority from Japanese Application No. 2012-238526, filed Oct. 30, 2012, the disclosure of which is hereby incorporated by reference herein in its entirety.

TECHNICAL FIELD

The present invention relates to an image reading device that reads both sides of a document and, more particularly, to an image reading device provided with a document conveying device having an illumination device and a reading unit for reading one side of the document whose other side has been read.

BACKGROUND ART

In an image reading device that reads an image on a document surface, light from a light source extending in a main scan direction is irradiated onto a document surface, reflected light from the document surface is received by a reading sensor such as a CCD, followed by photoelectric conversion, and whereby an image signal is output. Conventionally, in this image reading device, a fluorescence tube such as a xenon tube or a cold-cathode tube is generally used as an illumination device; however, in recent years, in order to respond to market requirements, such as absence of harmful chemical substances or low power consumption, an illumination device that uses a light-emitting diode (LED) as a light source is becoming widespread.

The LED, as a component single body, is small in occupancy area and thus has advantages in freedom of layout and a design freedom of a component to be combined with the LED. However, from another point of view, the LED is small in surface area and is thus low in heat radiating performance as a single body. In addition, while the fluorescence tube radiates most of generated heat as infrared rays, a pseudo-white LED generally used in the image reading device does not emit infrared radiation, resulting in a high heat generation rate in a light-emitting surface. When much current is supplied to the LED so as to obtain high luminance, the heat radiation amount is correspondingly increased. An increase in the temperature of the LED to a predetermined level or more may cause a reduction in light amount, a change in chromaticity, a reduction in the life of the LED and, in the worst case, breakdown of the LED element. When the LED is used to attempt to obtain high luminance output, there is a limit of heat radiation as the LED single body for the reason described above. To solve this problem, there is known an approach in which a metal heat radiation member having both heat conductive property and heat radiation property is tightly fitted to a substrate on which the LED is mounted so as to obtain a heat radiation effect. Further, there is known an image reading device which is provided with heat radiation members on both sides of a substrate on which the LED is mounted so as to further enhance the heat radiation effect (for example, see Patent Document 1).

CITATION LIST

Patent Document

[Patent Document 1] Jpn. Pat. Appin. Laid-Open Publication No. 2010-87809

DISCLOSURE OF THE INVENTION

Problems to be Solved by the Invention

In such a conventional invention, the LED is mounted on the substrate, the substrate is sandwiched between the metal heat radiation members each having high heat conductivity, and heat generated in the LED is released to the heat radiation member, whereby heat radiation property can be obtained; however, when a temperature of the heat radiation member is increased, moving ability of heat from the LED to heat radiation member is lowered, with the result that it is impossible to sufficiently suppress a temperature rise of the LED.

In such a case, a method can be employed, in which a heat radiation member having a larger area is used so as to enhance the heat radiation property; however, a volume of the entire device is disadvantageously increased so as to ensure an area in which the heat radiation member is disposed, which is undesirable for a device for which compactness is required.

The present invention has been made to solve such a problem of the conventional technology, and an object thereof is to provide an illumination device having a configuration in which a temperature rise of the radiation member is suppressed in a compact area to thereby maintain the temperature of the LED at a predetermined value or less and an image reading device provided with the illumination device.

Means for Solving the Problems

To solve the above problem, there is provide a linear illumination device including: at least one LED used as a light source; an elongated light guide member that receives light emitted from the light source at an end portion thereof in a longitudinal direction and diffuses the light in a main scan direction; a frame made of resin; a fan for suppressing a temperature rise of the LED; an LED substrate on which the LED is mounted; a first heat radiation plate that releases heat generated from the LED from a surface of the LED substrate opposite to a surface on which the LED is mounted; and a second heat radiation plate that releases heat generated from the LED from the surface of the LED substrate on which the LED is mounted. The second heat radiation plate, LED substrate, and first heat radiation plate are installed in this order on the frame having a support portion supporting the light guide, LED substrate, first and second heat radiation plates, the fan is disposed on a side of the first heat radiation plate opposite to the LED substrate, the second heat radiation plate has a cross-sectional profile having an area protruding with respect to a cross-sectional profile of the first heat radiation plate when viewing the frame from a direction perpendicular to a longitudinal direction thereof, and wind from the fan is blown against the first and second heat radiation plates.

Advantages of the Invention

With the configuration described above, the wind is aggressively blown against the two heat radiation plates installed on front and rear sides of the LED-mounted substrate, whereby it is possible to obtain heat-release effect that maintain a temperature of the LED at a predetermined value or less without increasing a size of the first heat radiation plate which is a main heat radiation plate installed on a side of the LED-mounted substrate where the LED is mounted. Further, the wind from the fan advances in a region surrounded between the first heat radiation plate and the area of the second heat radiation plate bent in a direction toward the first heat radiation plate, whereby the two heat radiation plates can be cooled efficiently.

BEST MODE FOR CARRYING OUT THE INVENTION

Figure 1:
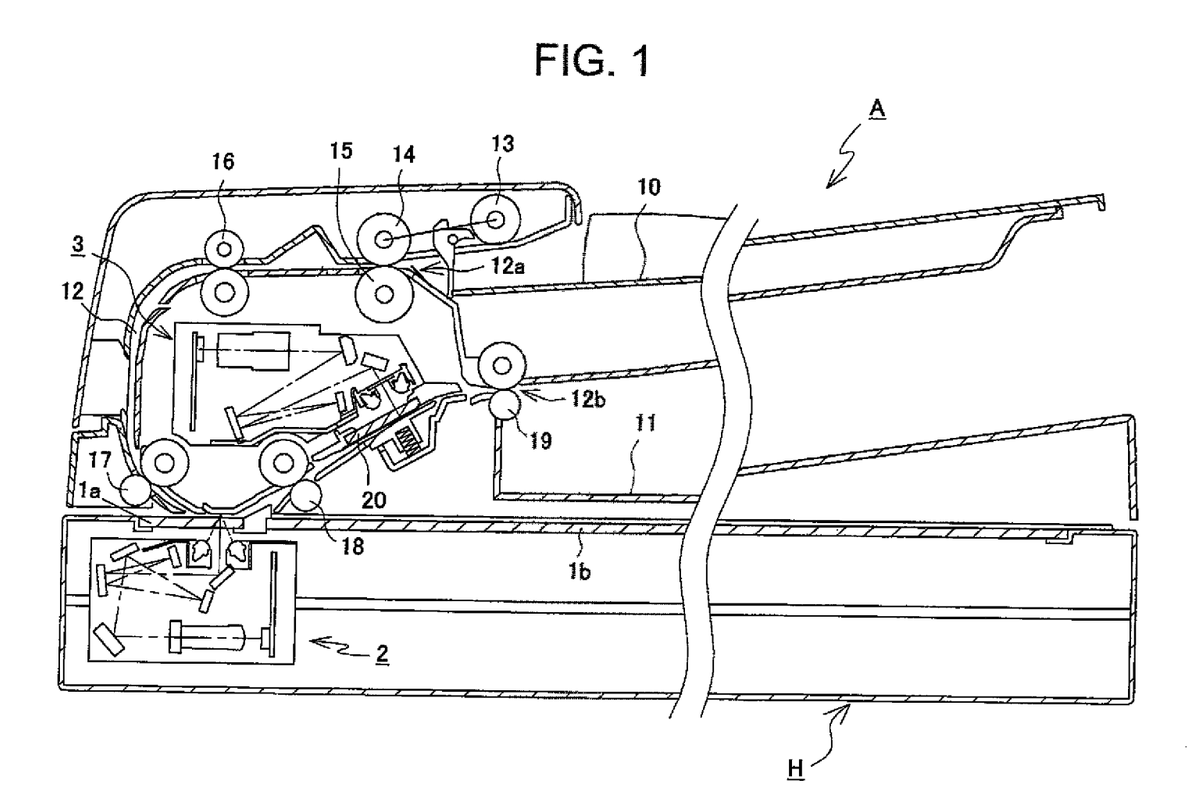
FIG. 1 is a cross-sectional view illustrating an entire configuration of an image reading device according to the present invention including an image reading device main body and a document conveying device.

An image reading device provided with an illumination device according to the present invention will be described below. FIG. 1 is a cross-sectional view illustrating an entire configuration of an image reading device including an image reading device main body and a document conveying device.

As illustrated in FIG. 1, the image reading device includes an image reading device main body H and a document conveying device A that conveys a document. The document conveying device A is mounted to the image reading device main body H through a not illustrated hinge. The document conveying device A is supported by the hinge so as to be openable/closable with respect to an upper surface of the image reading device main body H.

The image reading device main body H incorporates a first reading carriage 2 having a first reading section that reads one side of a document conveyed on an upper surface of a contact glass 1a by the document conveying device A. The document conveying device A incorporates a second reading carriage 3 having a second reading section that reads the other side of the document that has passed through the upper surface of the contact glass 1a of the image reading device main body H.

The document conveying device A is openably/closably mounted to the image reading device main body H so as to expose an upper surface of the image reading device main body H, and a document placed on a contact glass 1b of the image reading device main body H is read with the first reading carriage 2 moved.

As illustrated in FIG. 1, the document conveying device A has a sheet supply tray 10 on which a plurality of documents can be placed and a sheet discharge tray 11 that houses the read document. The sheet supply tray 10 is disposed above the sheet discharge tray 11 in an overlapping manner. A U-shaped document conveying path 12 is provided so as to extend from the sheet supply tray to up to the sheet discharge tray 11.

The document conveying path 12 includes, as illustrated in FIG. 1, an upstream side path extending from a sheet supply port 12a through which the document on the sheet supply tray 10 is delivered up to a resist roller pair 16, a curved intermediate path extending, while curving, from the resist roller pair 16, through the first contact glass 1a, up to a conveying roller pair 18, and a downstream side path extending from the conveying roller pair 18 up to a sheet discharge port 12b at which a discharge roller pair 19 is disposed. The document conveying path 12 is formed by a conveying guide member arranged on upper and lower sides thereof.

Along the document conveying path 12, there are provided a delivery roller 13 that abuts against the document placed on the sheet supply tray 10 and thereby delivers the document, a feeding roller 14 that feeds the delivered document, a separation roller 15 that is brought into pressure contact with the feeding roller 14 so as to feed the document one by one, a resist roller pair 16 that receives an abutment of a leading end of the document fed by the feeding roller 14 and the separation roller 15 for alignment and then feeds the document downstream, a conveying roller pair 17 disposed upstream of the first contact glass 1a, a conveying roller pair 18 disposed downstream of the first contact glass 1a, and a discharge roller pair 19 disposed downstream of the conveying roller pair 18 and discharges the document to the sheet discharge tray 11.

The document conveying device A incorporates the second reading section that reads a side of the document opposite to a side thereof read by the first reading section mounted on the first reading carriage 2. The second reading section is mounted on the second reading carriage 3, and the second reading carriage 3 is disposed inside the U-shaped document conveying path 12. The second reading carriage 3 has a third contact glass 20 at its end portion in a sheet discharge direction. The third contact glass 20 is disposed between the conveying roller pair 18 and the discharge roller pair 19. One surface of the third contact glass 20 serves as a part of the conveying guide member of the document conveying path 12. With this configuration, the second reading section can read the document passing through the surface of the third contact glass 20.

In a double-side reading mode, the document on the sheet supply tray 10 is delivered by the delivery roller 13 and fed one by one by the feeding roller 14 and the separation roller 15. The fed one document is aligned by the resist roller pair 16 and conveyed to the first contact glass 1a by the conveying roller pair 17. Thereafter, the document that has passed through the first contact glass 1a is conveyed to the third contact glass 20 by the conveying roller pair 18 and discharged to the sheet discharge tray 11 by the discharge roller pair 19. In this conveyance process, a front surface of the document is read by the first reading section when the document passes through the first contact glass 1a, and a rear surface of the document is read by the second reading section when the document passes through the third contact glass 20.

Figure 2:
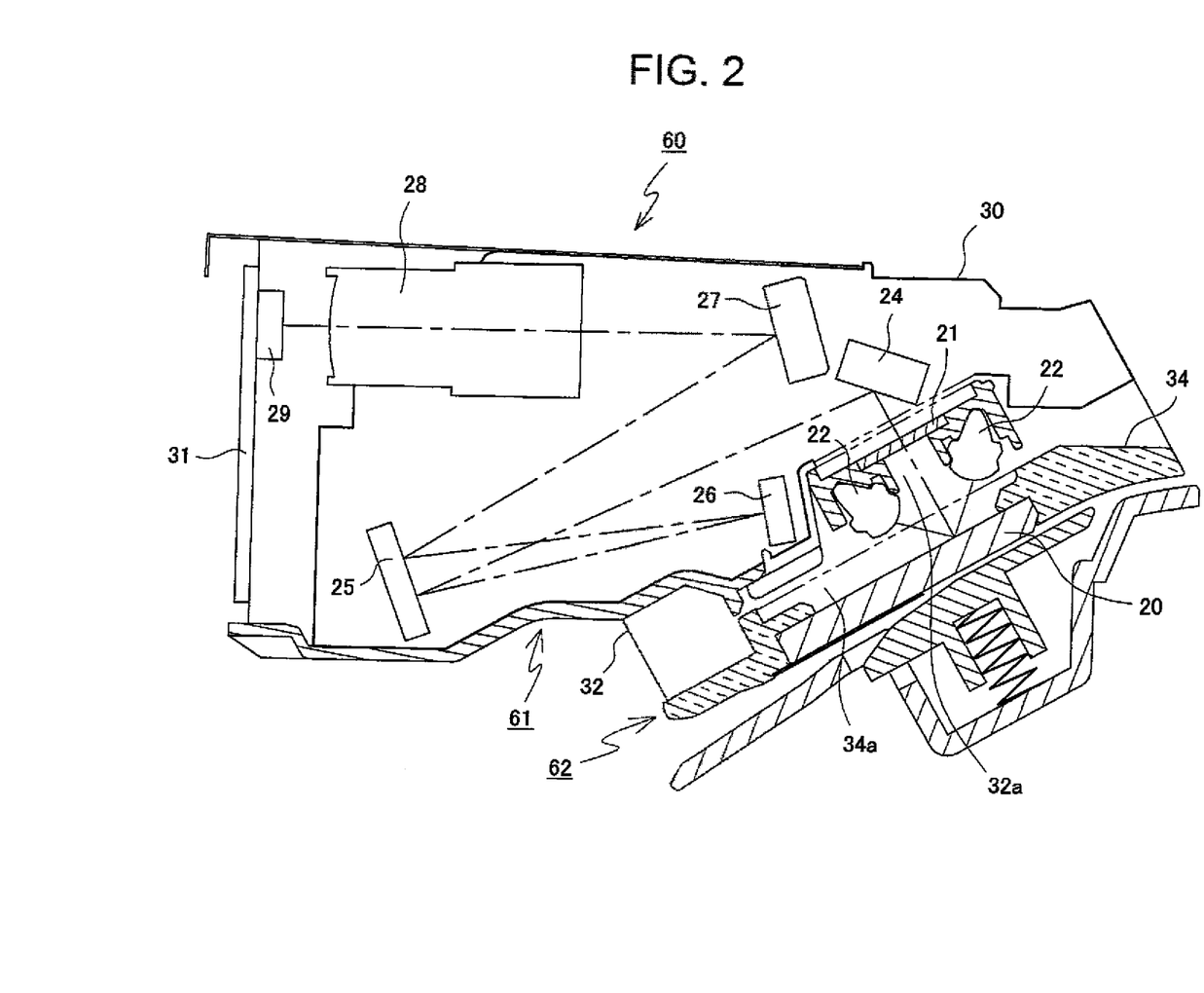
FIG. 2 is an enlarged cross-sectional view illustrating a second reading carriage according to the present invention.

The following describes configurations of the second reading carriage 3 and second reading section in the second reading carriage 3. FIG. 2 is an enlarged cross-sectional view illustrating the second reading carriage 3. The second reading carriage 3 includes a linear illumination device including an LED 49 for irradiating the document conveyed on the contact glass 20 with light and a light guide member 22, a plurality of mirrors 24, 25, 26, and 27 that lead reflected light from the document in a predetermined direction, a lens 28 that converges the reflected light led by the plurality of mirrors 24, 25, 26, and 27, and a CCD 29 that photoelectric-converts the light converged by the lens 28.

The second reading carriage 3 irradiates the document through the third contact glass 20 with light emitted from the linear illumination device. Light reflected from the document is reflected by the mirrors 24, 25, 26, and 27, converged by the lens 28, and then enters the CCD 29, where the light is subjected to photoelectric conversion for document image reading.

Figure 3:
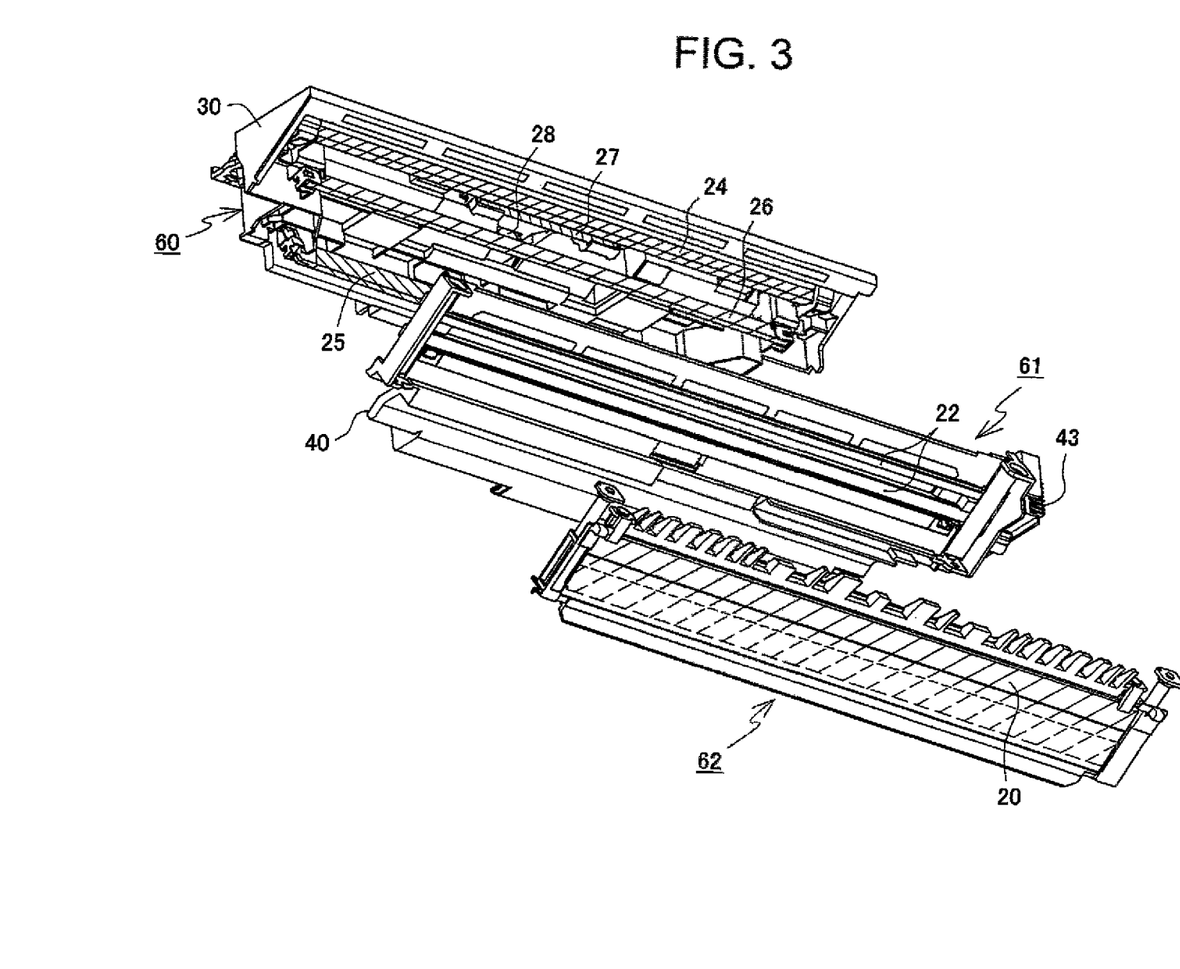
FIG. 3 is an exploded perspective view illustrating a configuration of the second reading carriage according to the present invention.

The second reading carriage 3 includes an optical unit 60, the linear illumination device (light source unit 61), and a glass unit 62. The optical unit 60 includes the four mirrors 24, 25, 26, and 27, lens 28, and CCD 29. The light source unit 61 includes a light source composed of the LED 49 and the light guide member 22. The glass unit 62 includes the third contact glass 20. As illustrated in FIG. 3, the optical unit 60, the light source unit 61, and the glass unit 62 are connected in this order to constitute the second reading carriage 3.

The optical unit 60 includes a resin first frame 30 having a substantially L-shaped cross-section and serving also as an exterior cover of the second reading carriage 3, the four mirrors 24, 25, 26, and 27 which are each provided so as to extend in a document width direction perpendicular to a document conveying direction, the lens 28, and a CCD substrate 31 mounted with the CCD 29.

Figure 5:
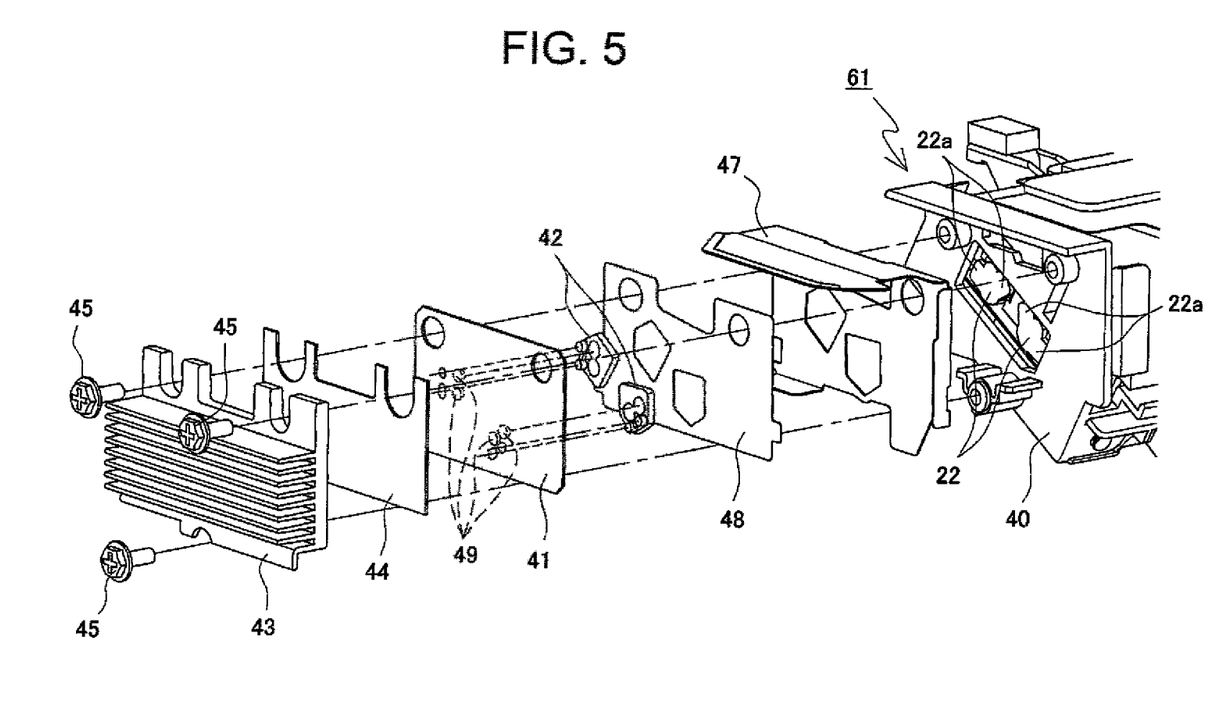
FIG. 5 is an exploded perspective view illustrating a structure of a main part of a light source unit according to the present invention.

The light source unit 61 includes a resin second frame 32 mounted to the first frame 30 so as to cover an inside of the first frame 30 to which the mirrors 24, 25, 26, and 27 are mounted, two light guide members 22 provided at one side of the second frame 32 so as to extend in the document width direction (main scan direction), a chip-like LED 49 (see FIG. 5) that is disposed at an end portion of each of the light guide members 22 in a longitudinal direction thereof and that emits light to be incident on the light guide members 22, an LED substrate 41 (see FIG. 5) mounted with the LED 49, a first heat radiation plate 43 (see FIG. 5) that radiates heat generated from the LED 49, and a second heat radiation plate 47 (see FIG. 5). Light of the LED 49 emitted from the end portion of each of the light guide members 22 in the longitudinal direction thereof is repeatedly reflected inside the light guide members 22 and is diffused in the main scan direction by a diffusion pattern that changes an irradiation direction to a document surface side to be an elongated liner illumination light. In a slit 32a formed in the second frame 32 so as to allow the light reflected from the document surface to be incident on the mirror 24, a protective glass 21 for protecting optical components in the carriage is disposed.

The glass unit 62 includes a third frame 34 made of resin and the third contact glass 20 mounted to a reading opening 34a formed in the third frame 34.

Figure 4:
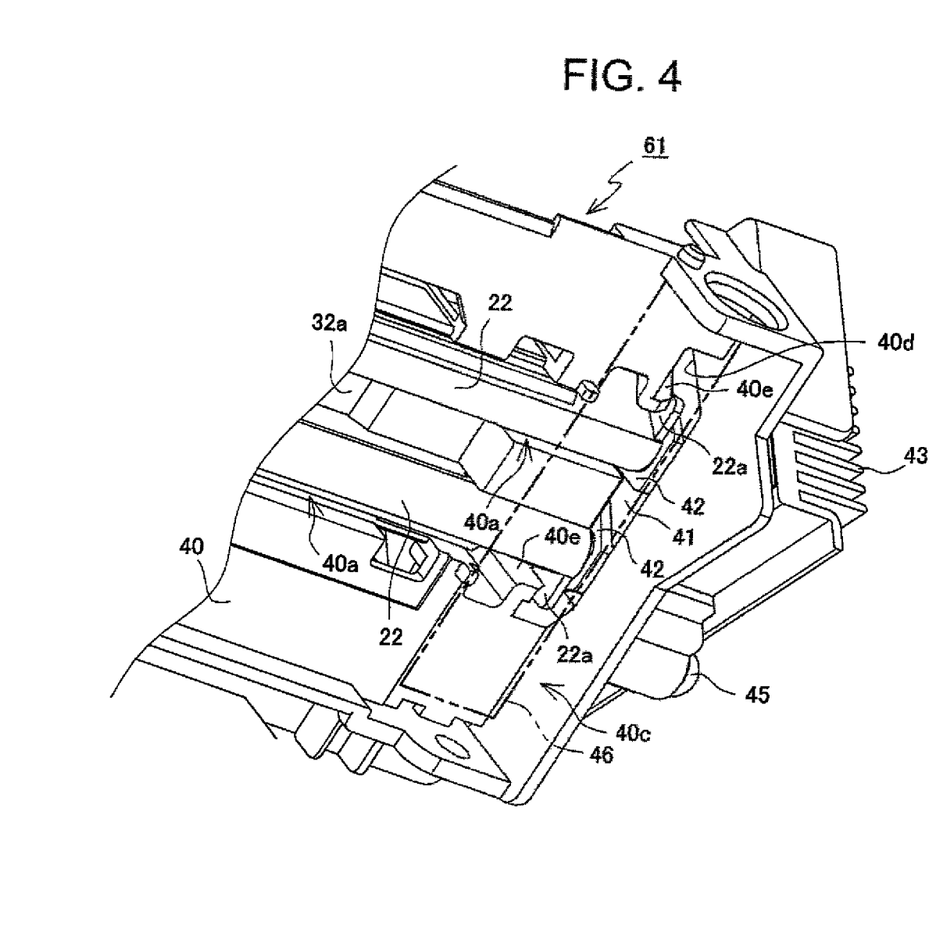
FIG. 4 is an enlarged perspective view illustrating a structure of a main part of the second reading carriage according to the present invention.

FIG. 4 is an enlarged perspective view illustrating an end portion on a side of the light source unit 61 where the LED 49 is mounted, and FIG. 5 is an exploded perspective view illustrating components of a light source section of the light source unit 61. The second frame 40 is made of resin and has, as illustrated in FIGS. 4 and 5, a concave portion 40a in which the light guide members 22 are mounted and the slit 32a formed between the two light guide members 22 mounted in the concave portion 40a so as to lead the light reflected from the document surface to the first mirror 24 in the optical unit 60. Further, an LED substrate mounting portion 40c to which the LED substrate 41 is mounted is formed at a side of the second frame 40 in a longitudinal direction thereof, and a large opening 40d through which the light guide members 22 penetrate is formed in the LED substrate mounting portion 40c.

The LED substrate 41 is a metal-base substrate formed of a copper plate excellent in heat conductivity and can quickly move heat generated from a semiconductor (chip-like LED, etc.) from a surface of the substrate on which the semiconductor is mounted to its opposite side and the entire surface of the substrate. Further, a reflector 42 is mounted to the LED substrate 41 so as to surround the LED 49. The reflector 42 is disposed between the LED substrate 41 and one surface of the longitudinal direction end portion of each of the light guide members 22 and enhances incidence efficiency of light emitted from the LED 49 to the light guide members 22. In the present embodiment, two LEDs 49 are provided for each light guide member 22, and the reflector 42 is disposed so as to surround the two adjacent LEDs 49.

Each light guide member 22 is made of an amorphous acrylic resin having high light transmittance. A projecting piece 22a is provided at two positions on the longitudinal direction one end portion of the light guide member 22. The two projecting pieces 22a are exposed through the opening 40d of the LED substrate mounting portion 40c of the second frame 40 and project outward from the light guide member 22 and each sandwiched between the reflector 42 and a restriction portion 40e as illustrated in FIG. 4, whereby the light guide member 22 is retained at a predetermined position. Further, a film member 46 for preventing come-off of the light guide member 22 from the concave portion 40a of the second frame 40 are provided at both ends of the light guide member 22. The film member 46 is attached to the second frame 40 by means of a double-sided tape and retains the light guide member 22 in the concave portion 40a of the second frame 40.

The first heat radiation plate 43 radiates heat of the LED 49 and the LED substrate 41 to thereby lower a heat of the LED 49. As illustrated in FIG. 5, the first heat radiation plate 43 is installed on a side of the LED substrate 41 opposite to a side where the LED 49 is mounted. In the present embodiment, in order to enhance heat radiation performance, the first heat radiation plate 43 is made of an aluminum having high heat conductivity and high specific heat and formed into a fin shape to increase a surface area thereof. Further, a heat conductive member 44 having high heat conductivity is provided between the LED substrate 41 and the first heat radiation plate 43. The heat conductive member 44 has elasticity, so that when minor undulations are present on surfaces of the respective LED substrate 41 and the first heat radiation plate 43, the heat conductive member 44 can be deformed along the surfaces thereof. As a result, contact heat resistance between the LED substrate 41 and the first heat radiation plate 43 is reduced, allowing the heat of the LED substrate 41 to be conducted to the first heat radiation plate 43 efficiently. In the present embodiment, as a material of the heat conductive member 44 excellent in heat conductivity, a mixed material of a silicone polymer and ceramics is used.

In addition to the first heat radiation plate 43, a second heat radiation plate 43 is installed on the side of the LED substrate 41 where the LED 49 is mounted so as to release the heat of the LED 49 and the LED substrate 41. In order to enhance heat radiation performance, the second heat radiation plate 47 is also made of aluminum as in the case of the first heat radiation plate 43. The surface of the LED substrate 41 where the LED 49 is mounted has a portion where a copper foil covering a pattern wiring connected to anode and cathode terminals for supplying current to the LED 49 is exposed. In order to electrically insulate the LED substrate 41 and the second heat radiation plate 47 made of aluminum from each other, an insulation member 48 is provided between the LED substrate 41 and the second heat radiation plate 47. In the present embodiment, as the insulation member 48, a polyester film having insulation characteristics is adopted.

The first heat radiation plate 43 is mounted to the second frame 40 by screws 45 with the heat conductive member 44, the LED substrate 41, the insulation member 48, and the second heat radiation plate 47 interposed in this order therebetween. As a result, the reflector 42 abuts against the side surface and projecting pieces 22a of each light guide member 22, whereby the LED 49 is positioned with respect to the light guide member 22. Further, with this configuration, adequate pressing force for deformation along the surfaces of the respective LED substrate 41 and first heat radiation plate 43 is applied to the heat conductive member 44 having elasticity.

The first heat radiation plate 43 has a plurality of plate-like heat radiation fins extending perpendicular to the surface thereof contacting the heat conductive member 44. An extending direction of the heat radiation fins will be described later.

As viewed from a side of the second frame 40 where the LED 49 is mounted, a cross-sectional profile of the second heat radiation plate 47 has an area protruding with respect to a cross-sectional profile of the first heat radiation plate 43. As described above, the second heat radiation plate 47 is disposed between the insulation member 48 and the second frame 40 and thus always contacts one of the surfaces of the insulation member 48 and the second frame 40. However, at least one of surfaces of the protruding area in the cross-sectional profile of the second heat radiation plate 47 contacts neither the insulation member 48 nor the second frame 40. Further, the surface of the protruding area in the cross-sectional profile of the second heat radiation plate 47 that contacts neither the insulation member 48 nor the second frame 40 does not contact any other component than the insulation member 48 and the second frame 40.

In the present embodiment, the protruding area in the cross-sectional profile of the second heat radiation plate 47 is bent toward the first heat radiation plate 43 at a position outside the cross-sectional profile of the first heat radiation plate 43. Further, the second heat radiation plate 47 is formed using a plate-like material having a thickness smaller than a thickness of at least a surface of the first heat radiation plate 43 that contacts the heat conductive member 44.

Figure 6:
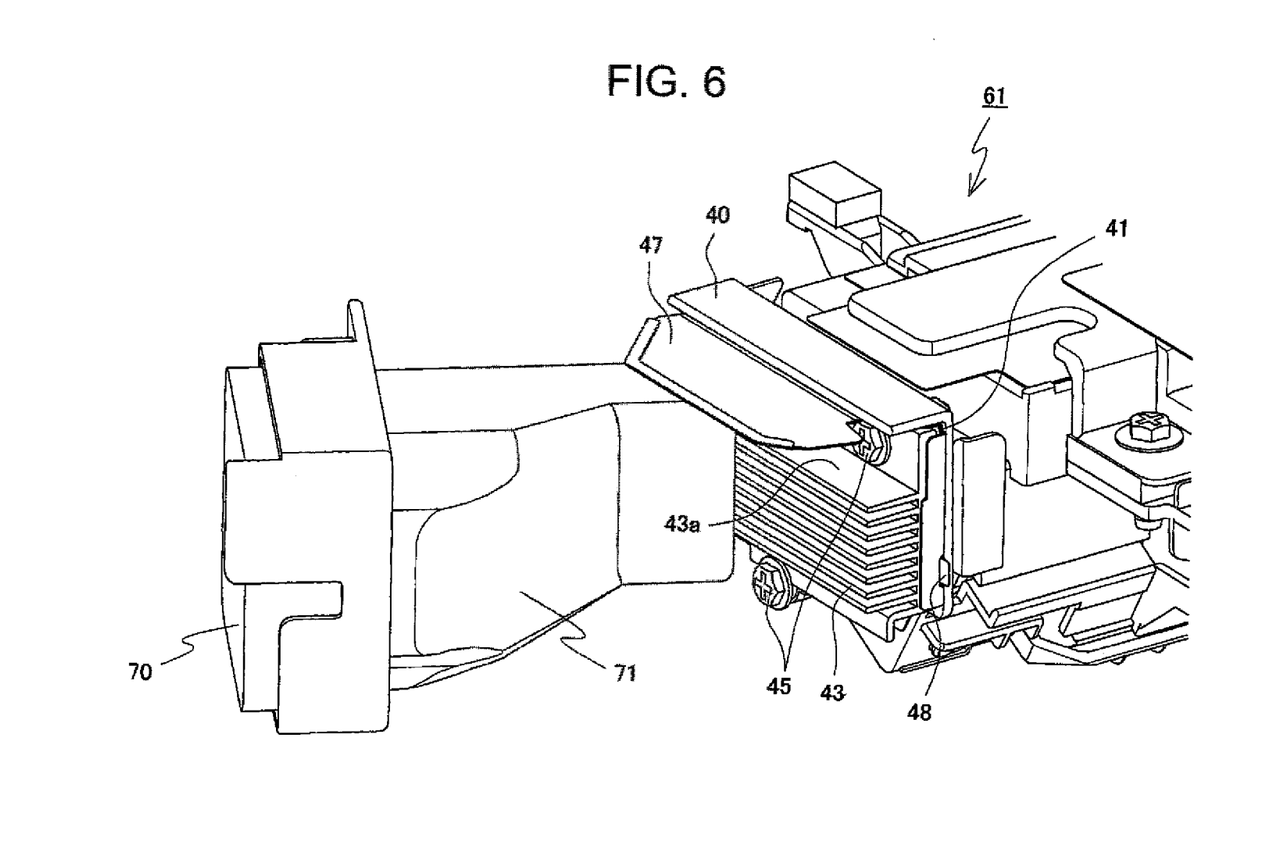
FIG. 6 is an enlarged perspective view illustrating arrangement of the light source unit and a fan.

FIG. 6 is an enlarged perspective view illustrating arrangement of an end portion of the light source unit 61 where the LED 49 is mounted and a fan. In the present embodiment, a high illuminance of 100,000 lux or more is required as the illuminance of a surface of a document to be read, so that a current of 1.5 A is supplied as a forward current of the LED 49. As described above, two LEDs 49 are used for each light guide member 22. Since the light source unit 61 uses two pairs of light guide members 22, a total of four LEDs 49 are mounted on the LED substrate 41. Assuming that a forward voltage of each LED 49 is 3.5 V and that four LEDs 49 are connected in series, a power of 21 W is consumed on the LED substrate 41. The LEDs 49 consume this much power, so that a large amount of heat is generated. Thus, it is impossible for the heat radiation plate having a size falling within the cross-section of the second reading carriage 3 disposed inside the U-shaped document conveying path 12 to control the temperature of the LED 49 to a predetermined value or less by natural cooling. An increase in the temperature of the LED to a predetermined level or more may cause a reduction in light amount, a change in chromaticity, a reduction in the life of the LED and, in the worst case, breakdown of the LED element.

Thus, forced cooling using a fan is employed to enhance the heat radiation performance. In the present embodiment, a fan 70 is used as the fan. A suction port (not illustrated) of the fan 70 is disposed near an exterior of the document conveying device A so as to take in air from outside the exterior of the document conveying device A. A duct 71 is provided between an end portion of the second reading carriage 3 on the side where the LED 49 of the light source unit 61 is mounted and fan 70. Wind discharged from a discharge port of the fan 70 advances in the duct 71 and is aggressively blown against the first and second heat radiation plates 43 and 47 to control the temperature of the LED to a predetermined value or less.

In the present embodiment, the wind from the fan is blown against the first and second heat radiation plates 43 and 47 and further the second reading carriage. At this time, foreign matters are not introduced into the second reading carriage 3 since the protective glass 21 for protecting optical components in the second reading carriage 3 is disposed as described above.

In the present embodiment, a leading end of a discharge port of the duct 71 is diagonally positioned with respect to one end of the first heat radiation plate 43 in a longitudinal direction thereof. The wind blown against the first heat radiation plate 43 advances from the longitudinal direction one end of the first heat radiation plate 43 against which the duct 71 is provided toward the longitudinal direction other end of the first heat radiation plate 43 along the surface of the first heat radiation plate 43. The above-mentioned heat radiation fins of the first heat radiation plate 43 extend parallel to the longitudinal direction of the first heat radiation plate 43. The wind discharged from the discharge port of the duct 71 is blown between the heat radiation fins of the first heat radiation plate 43 without being obstructed by other heat radiation fins.

Figure 7:
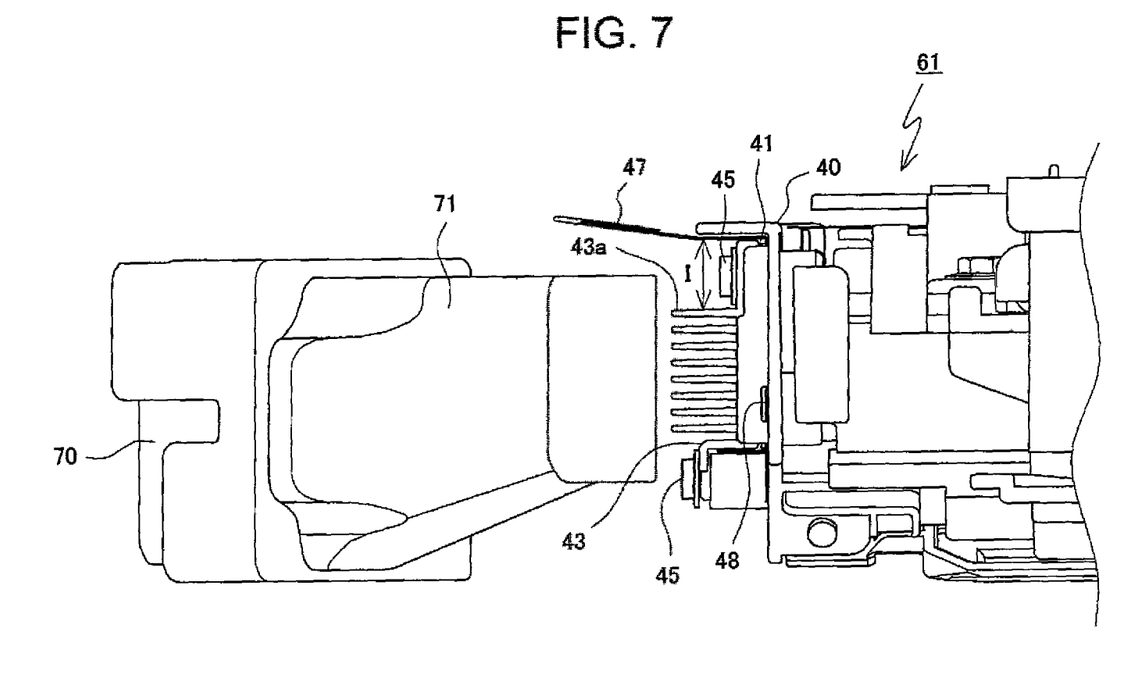
FIG. 7 is an enlarged cross-sectional view illustrating the arrangement of the light source unit and a fan.

FIG. 7 is a cross-sectional view illustrating arrangement of the end portion of the light source unit 61 where the LED 49 is mounted and fan as viewed in a direction perpendicular to the viewing direction of FIG. 1 which is the cross-sectional view illustrating the entire configuration of the image reading device including the image reading device main body and the document conveying device. A part of the bent area of the second heat radiation plate 47 extends above the heat radiation fins of the first heat radiation plate 43 up to a position outside the discharge port of the duct 71. A space I is formed between the heat radiation fins of the first heat radiation plate 43 and the bent area of the second heat radiation plate 47. A part of the wind discharged from the discharge port of the duct 71 is blown toward an upper side of a topmost heat radiation fin 43a and collides with an inner wall of the bent area of the second heat radiation plate 47. After that, a part of the wind that has collided with the inner wall and has rebounded back advances toward the topmost heat radiation fin 43a. Further, some wind advances directly toward the topmost heat radiation fin 43a. With this configuration, the topmost heat radiation fin 43a and the bent area of the second heat radiation plate 47 are efficiently cooled.

Further, as viewed from the side of the light source unit 61 where the LED 49 is mounted, the above-mentioned heat conductive member 44 has a cross-sectional profile having a size at least equal to or smaller than the cross-sectional profile of the first heat radiation plate 43 so as not to prevent the wind discharged from the discharge port of the duct 71 from advancing toward the inner wall of the bent area of the second heat radiation plate 47 and not to prevent the wind that has collided with the inner wall and has rebounded back from advancing toward the topmost heat radiation fin 43a.

Further, as viewed from the side of the light source unit 61 where the LED 49 is mounted, the above-mentioned insulation member 48 has a cross-sectional profile having a size at least equal to or smaller than the cross-sectional profile of the first heat radiation plate 43 so as not to prevent the wind discharged from the discharge port of the duct 71 from advancing toward the inner wall of the bent area of the second heat radiation plate 47 and not to prevent the wind that has collided with the inner wall and has rebounded back from advancing toward the topmost heat radiation fin 43a.

In the above-described embodiment, the protruding area of the second heat radiation plate 47 need not be bent toward the first heat radiation plate 43. At least one of the surfaces of the protruding area in the cross-sectional profile of the second heat radiation plate 47 contacts neither the insulation member 48 nor the second frame 40, so that the wind from the fan is blown against that surface, achieving heat radiation.

Further, in the above-described embodiment, the protruding area of the second heat radiation plate 47 may be bent in a direction opposite to the direction toward the first heat radiation plate 43. Furthermore, as viewed from the side of the light source unit 61 where the LED 49 is mounted, the second heat radiation plate 47 may have a shape that does not protrude with respect to the cross-sectional profile of the first heat radiation plate 43 but is bent in the direction opposite to the direction toward the first heat radiation plate 43. When at least a part of at least one of the surfaces of the second heat radiation plate 47 does not have an area contacting any other component, the wind from the fan is blown against that surface, achieving heat radiation.

In the above described embodiment, the first heat radiation plate 43 is mounted to the second frame 40 by the screws 45 with the heat conductive member 44, the LED substrate 41, the insulation member 48, and the second heat radiation plate 47 interposed in this order therebetween. As a result, the second frame 40 serves as a support member. Alternatively, however, a configuration may be adopted, in which the heat conductive member 44, the LED substrate 41, and the insulation member 48 are interposed in this order between the first and second heat radiation plates 43 and 47. In this case, the second heat radiation plate 47 serves as a support member. Further, a plate thickness of the second heat radiation plate 47 may be larger than a plate thickness of a base part of the first heat radiation plate 43.

The present invention is not limited to the above-described embodiment, and various modifications may be made based on the spirit of the present invention, and these modifications are not excluded from the scope of the present invention.

The present invention relates to an image reading device and thus has industrial applicability.

REFERENCE SINGS LIST

A: Document conveying device
H: Image reading device main body
3: Second reading carriage
21: Protective glass
22: Light guide member
22a: Light guide member projecting piece
40: Second frame
40c: LED substrate mounting portion
41: LED substrate
42: Reflector
43: First heat radiation plate
43a: Topmost heat radiation fin
44: Heat conductive member
45: Screw
47: Second heat radiation plate
48: Insulation member
49: LED
61: Light source unit (linear illumination device)
70: Fan
71: Duct

The invention claimed is:

1. A linear illumination device comprising:
at least one LED used as a light source;
an elongated light guide member that receives light emitted from the light source at an end portion thereof in a longitudinal direction and diffuses the light in a main scan direction;
a frame made of resin;
a fan for suppressing a temperature rise of the LED;
an LED substrate on which the LED is mounted;
a first heat radiation plate that releases heat generated from the LED from a surface of the LED substrate opposite to a surface on which the LED is mounted; and
a second heat radiation plate that releases heat generated from the LED from the surface of the LED substrate on which the LED is mounted, wherein
the second heat radiation plate, the LED substrate, and the first heat radiation plate arc installed in this order on the frame having a support portion supporting the light guide, the LED substrate, the first and second heat radiation plates,
the fan is disposed on a side of the first heat radiation plate opposite to the LED substrate,
the second heat radiation plate has a cross-sectional profile having an area protruding with respect to a cross-sectional profile of the first heat radiation plate when viewing the frame from a direction perpendicular to a longitudinal direction thereof, and
wind from the fan is blown against the first and second heat radiation plates.

2. The linear illumination device according to claim 1, wherein
the second heat radiation plate is formed into a plate-like shape, and
the protruding area has a shape obtained by bending the plate in a direction toward the first heat radiation plate at a position outside a cross-sectional profile of the LED substrate.

3. The linear illumination device according to claim 2, wherein
the first heat radiation plate has, on a surface thereof contacting the LED substrate, a plurality of plate-like heat radiation fins extending perpendicular to the surface contacting the LED substrate, and
a leading end of the bent plate of the second heat radiation plate is located at a position exceeding leading ends of the heat radiation fins of the first heat radiation plate.

4. The linear illumination device according to claim 1, wherein
the fan is a fan and has a duct on a discharge port side of the fan so as to aggressively blow wind generated by the fan against the first and second heat radiation plates.

5. The linear illumination device according to claim 4, wherein
the second heat radiation plate has a portion obtained by bending the plate in a direction toward the first heat radiation plate at a position outside a cross-sectional profile of the LED substrate, and
a leading end of the bent plate extends in a direction toward the fan beyond a leading end of the duct on the discharge port side.

6. The linear illumination device according to claim 1, wherein
a plate thickness of the second heat radiation plate is smaller than a plate thickness of the first heat radiation plate that contacts a surface of the LED substrate.

7. The linear illumination device according to claim 1, further comprising an insulation member between a surface of the LED substrate where the LED is mounted and the second heat radiation plate, and
when viewing the frame from the direction perpendicular to the longitudinal direction thereof, the insulation member has a profile having a size at least equal to or smaller than the cross-sectional profile of the first heat radiation plate.

8. The linear illumination device according to claim 1, further comprising a heat conductive member that transmits heat generated by the LED from an opposite side of the surface of the LED substrate where the LED is mounted to the first heat radiation plate, and
when viewing the frame from the direction perpendicular to the longitudinal direction thereof, the heat conductive member has a profile having a size at least equal to or smaller than the cross-sectional profile of the first heat radiation plate.

9. An image reading device comprising:
the linear illumination device as claimed in claim 1;
a plurality of mirrors that leads light reflected from a document to a predetermined direction for document reading;
a lens that converges the reflected light led by the plurality of mirrors; and
a CCD that photoelectric-converts the light converged by the lens.

* * * * *